Patented Apr. 30, 1935

1,999,345

UNITED STATES PATENT OFFICE 1,999,345

COMPOUND CATALYST

Donald R. Stevens, Pittsburgh, and William A. Gruse, Wilkinsburg, Pa., assignors to Gulf Refining Company, Pittsburgh, Pa., a corporation of Texas No Drawing. Application November 3, 1931, Serial No. 572,882

3 Claims. (Cl. 23—233)

This invention relates to compound catalysts; and it comprises a catalyst useful in relations where the catalytic activity of anhydrous aluminum chlorid is desired in a milder form, such catalyst consisting of a compound of aluminum chlorid with a phenol, such as phenol itself, a cresol, or a naphthol, the phenol being usually present in equimolecular proportions or less; all as more fully hereinafter set forth and as claimed.

As is well known, aluminum chlorid is a useful catalyst in various processes of purifying petroleum oils by obviating or reducing unsaturation, by removing sulfur compounds, etc., and is also useful as a depolymerizing catalyst adapted to form low boiling oils, like gasoline, at the expense of higher boiling oils, such as gas oil. These two functions of aluminum chlorid are quite distinct, but it is difficult in most cases to obtain the purifying action, as distinguished from the depolymerizing action, alone. Ordinarily, recourse is to low temperature operation when the refining action alone is wanted. For example, in treating lubricating oil and paraffin, where no formation of low boiling oils is wanted, it is the practice to limit the temperature to say, 150° F. At these low temperatures, these materials are quite viscous and mechanical difficulties are encountered in keeping the aluminum chlorid in suspension in the oil to be refined. It is desirable to be able to operate at somewhat higher temperature ranges without obtaining production of gasoline and low boiling oils. And in the production of gasoline and low boiling oils at a higher range of temperatures, the action of the aluminum chlorid is occasionally too violent.

We have found that by combining aluminum chlorid with a phenol in equimolecular proportions, a thick liquid composition is obtained which is readily stirred into oils. This composition has about the same total amount of activity per pound of aluminum chlorid contained, but its action is slower and milder. With the compound catalyst of the present invention, it is permissible in refining lubricating oil and paraffin to heat to higher temperatures than usual, thereby reducing the viscosity of the mixture, without the risk of forming low boiling oils. In other words, none of the lubricating oil is converted into less valuable, less viscous material.

Aluminum chlorid, as it is found in commerce, often contains several per cent of ferric chlorid; this originating in the bauxite used as a raw material. For the present purposes, aluminum chlorid containing ferric chlorid is equivalent to pure aluminum chlorid.

Where compositions are wanted with an energy of reaction intermediate between that of pure aluminum chlorid and that of the equimolecular combination of a phenol and aluminum chlorid, the proportion of phenol in the composition is diminished.

In making a composition under the present invention, aluminum chlorid is pulped mechanically with the required proportion of a phenol without heating, during which procedure substantially no HCl is evolved. Commercial cresylic acid, which is a mixture of the cresols, makes a good catalyst. However, we often use phenol itself, which is somewhat more expensive. For special purposes, it gives a particularly advantageous catalyst. Phenol-aluminum chlorid catalysts give low polymerization losses; but cresylic acids give complexes of more general utility.

A catalyst under the present invention, made by combining equi-molecular proportions of aluminum chlorid and of commercial cresylic acid, is a heavy, dark brown or red liquid. It is useful in refining oil and in making gasoline in exactly the same manner as aluminum chlorid. For conversion it is used in the same amount, making allowance for the phenol present. For refining, less may be used. It is not necessary, as is the case with aluminum chlorid alone, to pulp the catalyst with oil prior to adding it to the oil to be treated since the catalyst is itself liquid. However, it is sometimes convenient to dilute the catalyst with some of the oil with which it is subsequently to be used. Thinning may be done with commercial benzol or aromatic-rich petroleum naphthas. Excess cresols may also be used for thinning purposes.

In refining, the present catalyst does not exhibit some of the undesirable reactions of aluminum chlorid used alone. For instance, polymerization is reduced. The use of the present catalyst leads to no loss of anti-knock value.

In using the present catalyst for conversion reactions, that is in the production of lower boiling oils, the formation of coke, which is an unprofitable incident of the use of ordinary aluminum chlorid, is reduced. There is also less formation of gas. There is some indication that there is a greater production of cyclic compounds in the use of the present catalyst than is the case with aluminum chlorid alone.

In making the present compound catalyst, impure commercial phenols, such as "cresylic acid", containing neutral hydrocarbons can be used.

As illustrating the difference in properties of the present catalysts as compared with aluminum chlorid may be cited some work in which a solar oil treated with 2 per cent of anhydrous aluminum chloride at 450° C. gave a gasoline yield of 47 per cent, a coke loss of 4.4 per cent and a gas loss of 18 per cent. On the other hand using one of the present catalysts, a complex of aluminum chloride with an equal molecular proportion of ordinary phenol, a 2 per cent addition (calculated on the aluminum chlorid) gave a gasoline yield of 44 per cent with zero coke loss and a gas loss of 15 per cent. The temperature of conversion was the same. The complex catalyst gave a little less gasoline but the loss and deterioration of residual oil were considerably less. This was in a converting operation. Making a similar comparison of a refining operation, a cracked gasoline distillate treated at 90° C. with 1 per cent of aluminum chloride gave good results as far as refining went. The loss by polymerization was 9.5 per cent. On repeating the treatment with the same gasoline and with the same amount of aluminum chlorid, combined however with phenol in equal molecular proportions, there was obtained the same degree of refining with a polymerization loss of but 1.5. With aluminum chlorid alone, the loss of oil to sludge was 2.5 per cent while with a compound catalyst the similar loss as sludge was only 0.5 per cent. In a general way, it is found that 0.6 per cent of aluminum chlorid combined with phenol is about as effective as 1 per cent of aluminum chlorid used alone.

The compound catalyst of the present invention is not only useful in converting and refining operations of the ordinary type but it is also adapted, under suitable conditions, for converting gaseous hydrocarbons into liquid; or for inducing condensation of gaseous hydrocarbons with liquid hydrocarbons; as in causing relatively heavy oils to take up refinery gases under heat and pressure. This compound catalyst is useful in hydrogenation.

It is commonly most convenient to combine the aluminum chlorid and the phenol to produce a compound catalyst; this compound catalyst being then added to the oil to be treated. However, the results are much the same where phenol is added to the oil and an addition of aluminum chlorid afterwards made. The phenol and the aluminum chlorid combine to form the catalyst of the present invention.

Certain processes wherein the catalyst of our present invention is employed for the improvement of petroleum products are described and claimed in our copending application Serial No. 578,412, filed December 1, 1931.

What we claim is:

1. As a catalyst for reactions involving petroleum oils and the like, a composition of matter consisting of aluminum chloride and a phenol in which the anhydrous aluminum chloride and the phenol are present in substantially equimolecular proportions.

2. As a catalyst for reactions involving petroleum oils and the like, a composition consisting of aluminum chloride and a phenol; the aluminum chloride being present in a proportion not less than equimolecular.

3. As a catalyst for reactions involving petroleum oils and the like, a composition of matter consisting of anhydous aluminum chloride and commercial cresylic acid; the amount of cresylic acid in the composition being not substantially greater than that corresponding to equimolecular proportions.

DONALD R. STEVENS.
WILLIAM A. GRUSE.